July 6, 1971 H. MARKHAM ET AL 3,591,525
MANUFACTURE OF CATALYSTS
Filed March 28, 1969
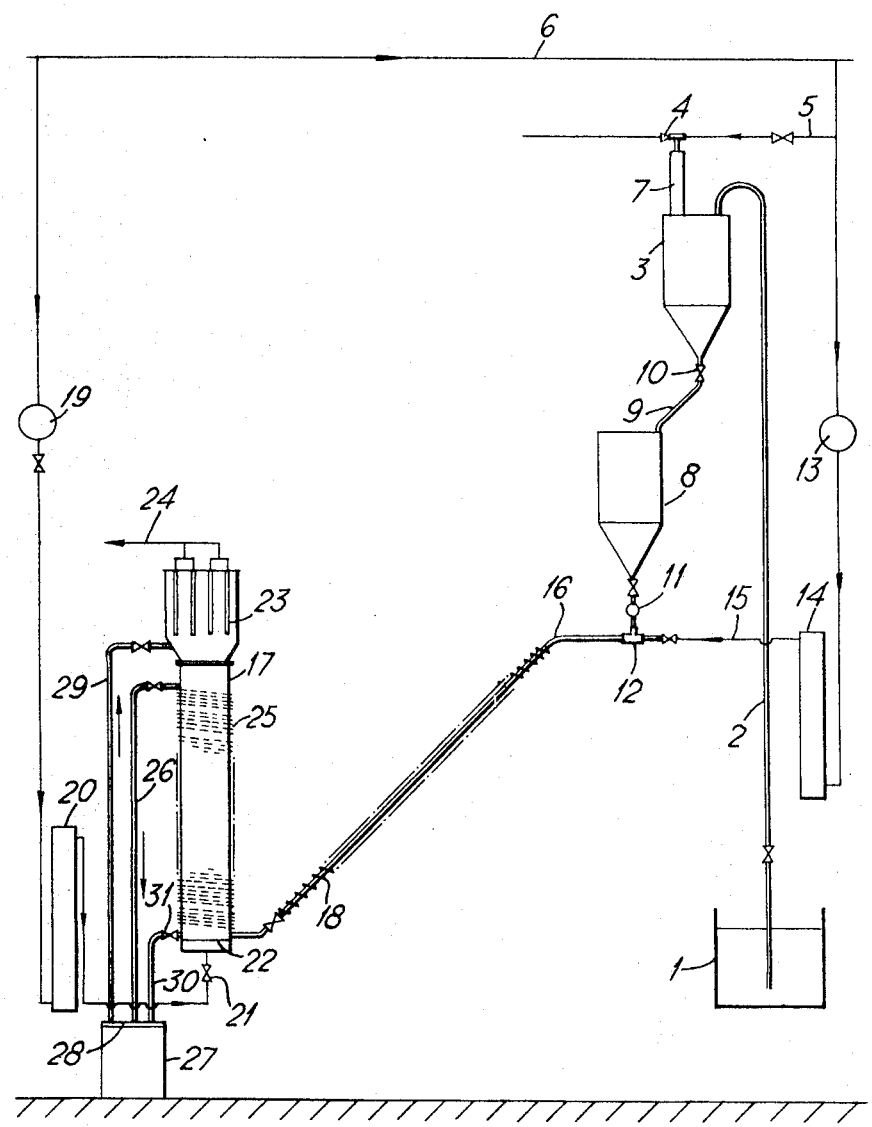

3,591,525
MANUFACTURE OF CATALYSTS
Harry Markham, Sheffield, Peter H. Pinchbeck, Chesterfield, and Phillippe Pierre Gaynor, Sheffield, England, assignors to United Coke & Chemicals Company Limited, Yorkshire, England
Filed Mar. 28, 1969, Ser. No. 811,559
Int. Cl. C07c 63/02
U.S. Cl. 252—440
2 Claims

ABSTRACT OF THE DISCLOSURE

A catalyst consisting of a glass of vanadium pentoxide and potassium pyrosulphate absorbed by silica gel particles is produced by continuously introducing a preheated mixture of silica gel particles and particles of the glass into a hot fluidised bed of the particles. The catalyst, when used in the production of phthalic anhydride, gives a better yield than a similar catalyst produced by a batch process.

---

This invention relates to the production of a catalyst consisting of porous solid particles carrying a glass of vanadium pentoxide and potassium pyrosulphate.

United States Patent No. 3,226,338, issued to the assignees of the present application, describes a process for the production of such catalyst particles in which a fluidised bed of the porous particles is formed, solid particles of the glass are dispersed throughout the bed and the bed is maintained at a temperature at which the glass melts until all the glass is absorbed as such by the porous particles. As described in Pat. No. 3,226,338, the process is of a batch nature. Such catalysts have been produced on a very large scale by the process described in Pat. No. 3,226,338, and have proved highly successful in the oxidation of naphthalene to phthalic anhydride, but the process suffers from one disadvantage which will now be explained.

When these catalysts are used in the oxidation of naphthalene at optimum conditions a small proportion of 1:4 naphthoquinone is produced instead of phthalic anhydride. This naphthoquinone may be tolerated in very small amounts, say up to 1.5%, but excessive amounts of it are objectionable in the crude phthalic anhydride and cause losses in purification. We have found that some catalysts produced by the process described in Pat. No. 3,226,338, when used in the oxidation of naphthalene, tend to deteriorate slowly over a period of two or three months. This deterioration is indicated by increase in the proportion of naphthoquinone from an initial 1% to 3% or more. To reduce the proportion of naphthoquinone once more it is usual to increase the reaction temperature, and this causes some reduction in the optimum yield of phthalic anhydride by over-oxidation to maleic anhydride or oxides of carbon.

It is well known that in this type of catalyst the carrier particles may most advantageously be of silica gel having a surface area in excess of 250 square metres per gram, and preferably in the range 350 to 450 square metres per gram, with an average pore diameter in excess of 40 Angstrom units and preferably in the range 50 to 100 Angstrom units. At the same time the pore structure of the silica gel should not be such as to lead to a weak, friable catalyst subject to excessive attrition in use. For this reason the pore volume of the silica gel preferably falls within the range of 0.5 to 1.0 ccs./gm. We have found that some silica gels which possess the desired surface area, pore diameter and pore volume give the catalysts which deteriorate. It has not proved possible to predict whether any siilca gel of otherwise satisfactory properties will suffer from this defect when used as a catalyst carrier, though it is believed that the determining factor may be the ease with which the surface of the silica is wetted by the liquid-catalytic glass, which in turn controls the proportion of the silica surface coated by the glass.

Our object in the present invention is to produce catalysts in which this tendency to deterioration is absent or much reduced.

According to the present invention, a preheated mixture of silica gel particles and particles of the glass is continuously introduced in a stream of air into the lower part of a fluidised bed of the particles maintained at a temperature between 300 and 400° C. and product particles are continuously removed from the top of the bed.

We aim at bringing the preheated mixture of particles to a temperature above the melting temperature of the glass immediately after its introduction into the lower part of the fluidised bed, so as to give each carrier (silica gel) particle the maximum opportunity of receiving the same proportion of glass as each other carrier particle. Glass particles carried upwards through the bed increasingly collide with carrier particles that are already coated, and this gives rise to uneven coating. The preheating is important, since carrier particles with superficial or physically absorbed water will not absorb the glass and if they enter the bed, time is taken while they absorb heat and lose the water, and in this time they are carried up the bed to incur the risk of inadequate coating. Preferably, therefore, to eliminate the water before the particles enter the bed, the preheating temperature is at least 100° C.

Whatever the actual mechanism by which improvement in the coating is obtained, it is most surprisingly found that when the catalyst is made according to the present invention the proportion of naphthoquinone either does not increase at all or increases by a tolerable amount, to, say 1.5%, in the same time, whatever silica gel is used as a carrier, provided of course that its surface area, pore diameter and pore volume are suitable. This improvement means an appreciable increase in the desired final product (phthalic anhydride) when the catalyst is made from a silica gel that has previously been unsatisfactory.

In starting up the process the reactor should be charged with catalyst particles previously made by the same process or by the process described in Pat. No. 3,226,338. With a bed thus established, the introduction of the preheated mixture can begin.

The preferred process according to the invention will now be described with reference to the accompanying drawing, which shows diagrammatically the plant in which the process is carried out.

In this process a mixture of vanadium pentoxide and potassium pyrosulphate is melted, cooled to a glass, cast, ground to about 100 BS mesh, weighed and mixed with silica gel particles of 40 to 100 A. pore diameter and of particle size between 50 and 300 BSS mesh.

The mixture is withdrawn from a reservoir 1 by suction through a flexible pipe 2 in a closed hopper 3 in which the suction is set up by an air ejector 4 in a branch 5 from a compressed-air ring main 6. To prevent the discharge of dust particles into the atmosphere a filter 7 is interposed between the ejector 4 and the hopper 3. The hopper 3 discharges into a second closed hopper 8 through a pipe 9. The charging of the hopper 3 is intermittent, and while it is taking place a valve 10 in the pipe 9 is closed.

From the hopper 8 the mixture passes under the control of a continuously driven, rotary star valve 11 into an ejector 12. Compressed air from the ring main 6 flows through a meter 13, a preheater 14 and a pipe 15 to this ejector, and the mixture of particles is thus carried in a stream of hot air through a pipe 16 to the lower part of a column 17 containing a fluidised bed of particles.

The temperature in the pipe 16 is maintained at a little over 100° C. by a heating element 18 around the pipe. This is found to be advantageous in removing superficial or physically absorbed water from the particles of the silica gel before these enter the fluidised bed.

The bed is fluidised by compressed air which flows from the main 6 through a meter 19 and a preheater 20, which is externally heated electrically, to the base of the column 17 under the control of a valve 21 and emerges through a distribution ring or grid plate 22. This air flows upwards through the column to maintain the particles fluidised in the column.

At the top of the column there are filters 23, through which the air passes to flow to a chimney through a pipe 24.

On entering the column 17, which is maintained at a high temperature by means of external electrical heating elements 25, the particles are rapidly heated to a temperature between 300 and 400° C., at which the glass of vanadium pentoxide and potassium pyrosulphate melts. Impregnation of the silica gel then occurs.

The product is removed from the top of the bed through an overflow pipe 26, which delivers it into a drum 27 through a cover 28, drums being successively brought beneath and closed by the cover. A pipe 29 runs from the cover 28 to the column 17 to allow the pressures to equalise. The reactor 17 may be completely emptied when required through a pipe 30 controlled by a valve 31.

As an example one column 17 was 11 feet high and 16 inches in diameter. The bed temperature was maintained at 370 to 380° C. and the air velocity was ½ foot per second in the reactor. A mixture of 4 parts of silica gel and 1 part of the powdered glass of vanadium pentoxide and potassium pyrosulphate was added at a rate of 200 lb. per hour through the pipe 16, which was 1½ inches in diameter and maintained at 110° C., and in which air was flowing at a linear velocity of 10 feet per second. The product overflowing from the bed was suitable for use as a catalyst in the oxidation of naphthalene.

The advantage obtained by means of the invention is shown by the results obtained in a prolonged test. A silica gel was supplied by a manufacturer to the following specification:

pore volume—0.7–0.8 cc./g.
surface area—350–450 m.²/g.
pore diameter—60–90 angstroms size grading:
>295 microns—10% maximum
295–152 microns—25% maximum
152–76 microns—remainder
76–53 microns—10% maximum
<53 microns—5% maximum Some of this silica gel was used with glass to make catalyst according to present invention, and more of the same gel and the same glass were used to make catalyst by the batch process described in Pat. No. 3,226,338. Both catalyst were then used to produce phthalic anhydride from naphthalene at optimum operating conditions for phthalic anhydride conversion.

With the catalyst produced by the batch process, the proportion of naphthoquinone initially produced was 0.8 %, and after six months operation had increased to 2.0 %. The reactor temperature then had to be increased in order to decrease the naphthoquinone proportion with a resultant reduction in phthalic anhydride yield.

With the catalyst produced according to the present invention the initial proportion of naphthoquinone was 0.4% and after six months this had only risen to 0.9%.

We claim:
1. A process for the production of a catalyst consisting of silica gel particles carrying glass of vanadium pentoxide and potassium pyrosulphate which comprises continuously introducing a preheated mixture of the silica gel particles and particles of the glass in a stream of air into the lower part of a fluidised bed of the same mixture maintained at a temperature between 300 and 400° C., and continuously removing product particles from the top of the bed.

2. A process according to claim 1 in which the mixture of the particles is introduced into an air stream and the particle-laden air stream is preheated to a temperature of at least 100° C., thereby eliminating moisture from the particles, before the mixture is introduced into the fluidised bed.

References Cited
UNITED STATES PATENTS 3,167,567  1/1965  Nonnenmacher et al. 252—440X
3,182,027  5/1965  Riley _____ 252—440X
3,226,338  12/1965 Riley et al. _____ 252—440

PATRICK P. GARVIN, Primary Examiner

U.S. Cl. X.R.
260—346.4